3,239,334
COLUMBIUM BRAZING ALLOY
Charles A. Javorsky, Los Alamos, N. Mex., and John S. Howe, Albany, Oreg., assignors to the United States of America as represented by the United States Atomic Energy Commission
No Drawing. Filed Nov. 1, 1963, Ser. No. 320,966
3 Claims. (Cl. 75—175.5)

The present invention relates to an alloy of titanium and, more particularly, to an alloy containing a major proportion of titanium and minor proportions of columbium, vanadium, chromium and aluminum which is especially useful as a brazing alloy for joining columbium and columbium base alloys.

Columbium metal is highly useful for a large variety of purposes due to chemical inertness, excellent mechanical properties and special properties such as low neutron absorption which are of advantage, for example, in the fabrication of nuclear reactor components. However, fabrication of columbium presents a variety of difficulties. The joining of columbium metal and/or columbium alloy components without serious loss in physical properties, corrosion, and oxidation resistance is difficult to achieve as an economical and routine operation.

It has now been found that titanium used in major proportions as the base material with varying lesser amounts of columbium, vanadium, chromium and aluminum provides an alloy which possesses excellent properties for the fusion joining of columbium and columbium base alloys. Excellent physical properties are obtained at both low and high temperatures together with good ductility properties.

According, it is an object of the invention to provide an alloy for producing fusion welded or brazed joints with columbium and columbium base alloys.

Another object of the invention is to provide an alloy consisting predominantly of titanium for the fusion joining of columbium and columbium base alloy fabrications.

Still another object of the invention is to provide an alloy containing predominant proportions of titanium with lesser amounts of columbium, vanadium, chromium and aluminum having excellent physical properties, corrosion resistance and good ductility.

A further object of the invention is to provide an alloy comprising predominantly titanium with lesser amounts of columbium, vanadium, chromium and aluminum for producing brazed joints in columbium and columbium base alloys having excellent physical properties, corrosion resistance and good ductility.

Other objects and features of advantage will be apparent in the following description of the invention.

In accordance with the invention, titanium is combined in the molten state with about 20% columbium, about 10% vanadium, about 9% chromium and about 2.5% aluminum to provide a preferred alloy which is especially useful for the fusion joining of columbium and columbium base alloys, as well as being useful, per se, it is contemplated, as a fabrication material or for other purposes in view of the properties thereof. All of the foregoing proportions, as well as those elsewhere herein, are expressed in percentage by weight unless otherwise specified. The composition of the alloys may, however, be varied over the following ranges:

|  | Percent by weight |
|---|---|
| Columbium | 17 to 23 |
| Vanadium | 10 to 11 |
| Chromium | 8 to 10 |
| Aluminum | 2 to 3 |

It is preferred that the components be combined by melting in an inert atmosphere or otherwise with limited access to air, such as in a vacuum melting furnace. The resulting alloy is then cast or otherwise formed into rods or wire suitable for use in fusion welding, preferably as in an arc welding process in an inert atmosphere, e.g., helium or argon, with a non-consumable electrode, such as tungsten.

Alloys of the preferred composition set forth hereinabove have been found to possess the following characteristics and properties which may be considered to be typical and exemplary. As typically utilized for fusion joining of columbium and columbium base alloys, a strip of the brazing alloy is placed in the joint to be welded. Then the joint is arc welded (fusion welded) with a tungsten electrode in an inert atmosphere.

| Condition | Hardness, Rockwell A | Yield strength, 1,000 p.s.i. | Ultimate tensile strength, 1,000 p.s.i. | Percent Elongation |
|---|---|---|---|---|
| As-cast, annealed 1,200° C. for 45 minutes | | 118 | 119 | 17 |
| Warm-rolled 850° C., 32 pct | 67 | 134 | 140 | 11 |
| Cold-rolled 25 pct. (low Cb) | 69 | 145 | 159 | 8 |
| Cold-rolled 56 pct. (high Cb) | 69 | | 183 | 4 |
| Aged 600° C., 16 hours | 66 | 123 | 123 | 19 |

The brazing alloy will make good weld joints in columbium and columbium alloys. Columbium alloy F–48 (commercial) when welded with the brazing alloy has a tensile strength of 116,000 p.s.i. with 4-percent elongation at room temperature, 21,000 p.s.i. and with 5-percent elongation at 1,000° C. The brazing alloy itself has a strength of about 120,000 p.s.i. to 180,000 p.s.i. depending upon its history. The melting point of the alloy is about 1,673° C.

While there has been described in the foregoing what may be considered to be preferred embodiments of the invention, modifications may be made therein without departing from the teachings of the invention and it is intended to cover all such as fall within the scope of the appended claims.

What is claimed is:

1. A titanium base alloy consisting essentially of substantially 17 to 23% by weight of columbium, about 10 to 11% by weight of vanadium, about 8 to 10% by weight of chromium, about 2 to 3% by weight of aluminum and with the remainder being titanium, said alloy characterized by high strength and retention of high strength at elevated temperatures.

2. A titanium base alloy especially useful for the fusion joining of columbium and columbium base alloys consisting essentially of 53 to 63% by weight of titanium, 17 to 23% by weight of columbium, about 10 to 11% by weight of vanadium, about 8 to 10% by weight of chromium, and about 2 to 3% by weight of aluminum, said alloy characterized by high strength and retention of high strength at elevated temperatures.

3. A titanium base alloy especially useful for fusion joining of columbium and columbium base alloys consisting essentially of about 58.5% by weight of titanium, 20% by weight of columbium, 10% by weight of vanadium, 9% by weight of chromium and 2.5% by weight of aluminum, said alloy characterized by high strength and retention of high strength at elevated temperatures.

References Cited by the Applicant

UNITED STATES PATENTS

| | | | |
|---|---|---|---|
| 2,892,706 | 6/1959 | Jaffee | 75—175.5 |
| 2,968,586 | 1/1961 | Vordahl | 75—175.5 |
| 3,156,590 | 10/1964 | Vordahl | 75—175.5 |

FOREIGN PATENTS 810,949    3/1959    Great Britain.

DAVID L. RECK, *Primary Examiner.*

W. C. TOWNSEND, C. N. LOVELL,
*Assistant Examiner.*